Dec. 12, 1950  S W. DENNIS ET AL  2,533,437
CONTAINER CLOSING APPARATUS
Filed July 1, 1947  4 Sheets-Sheet 1
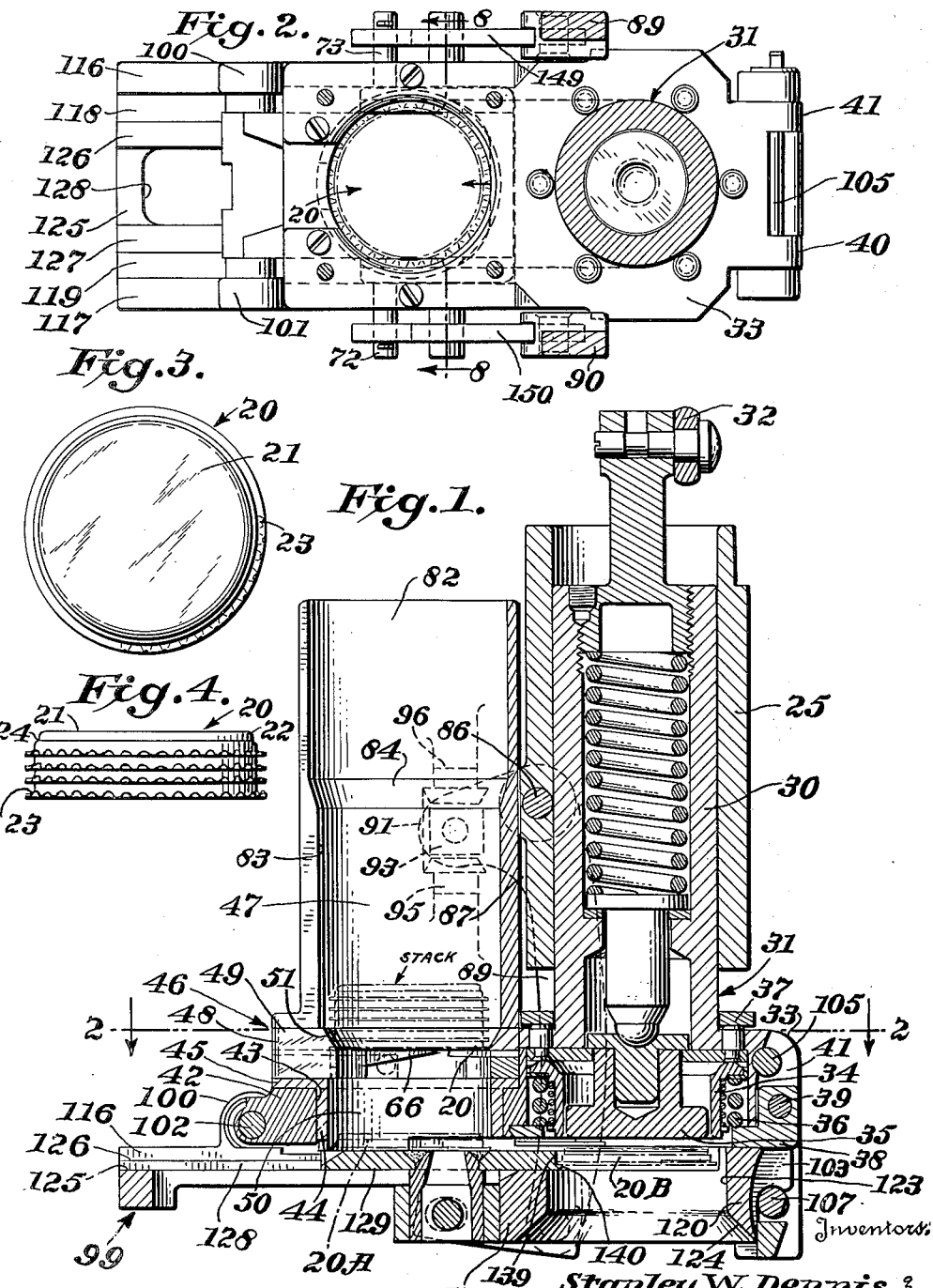
Inventors:
Stanley W. Dennis,
Edgar Henschen,
By Cushman Darby & Cushman
Attorneys

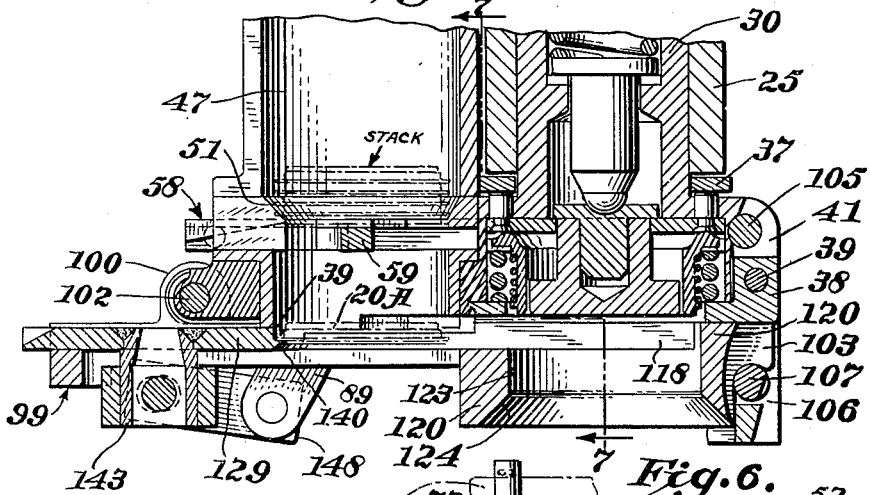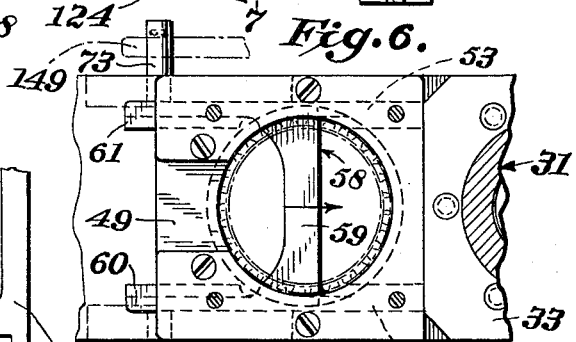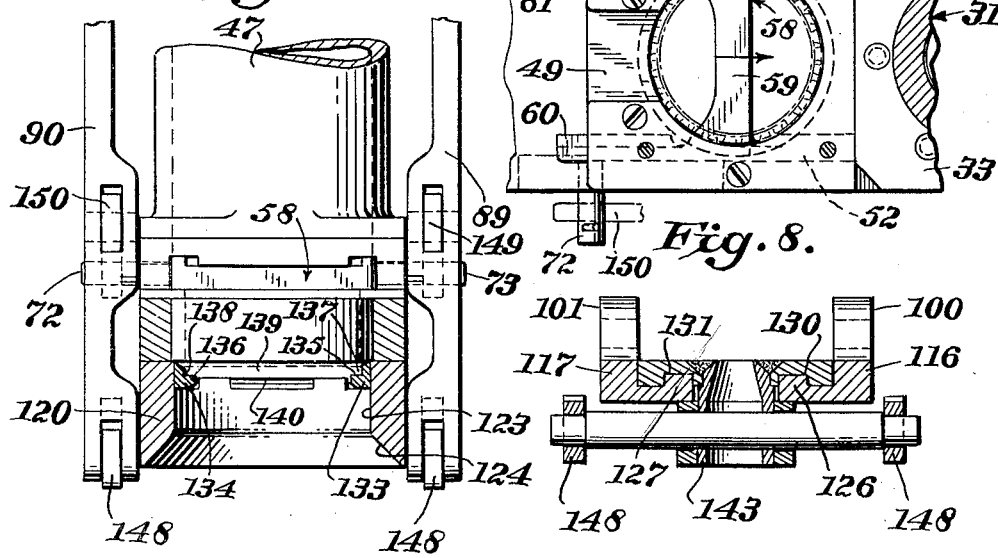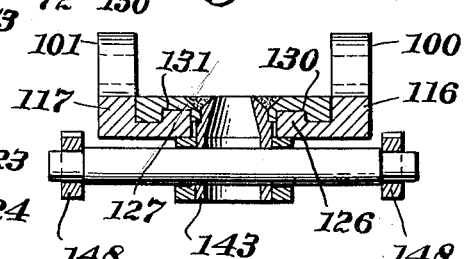

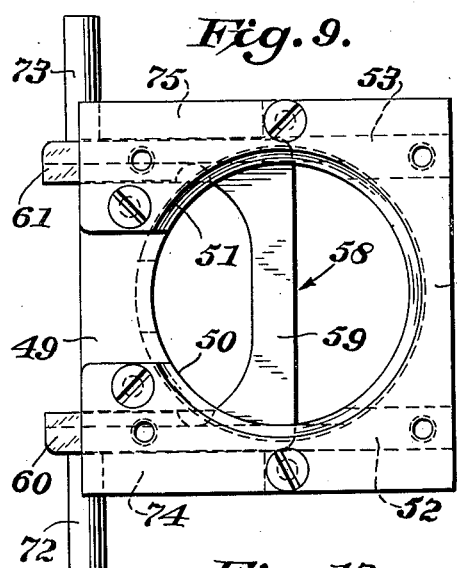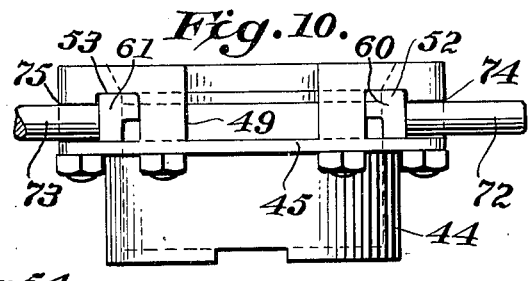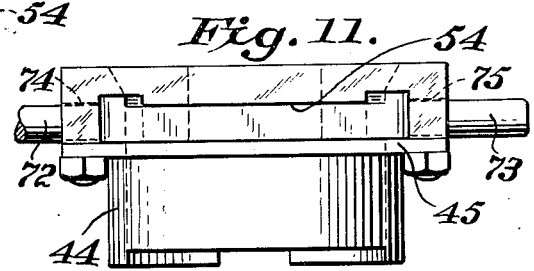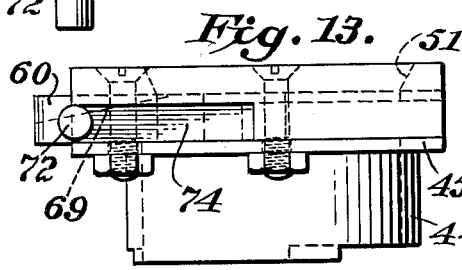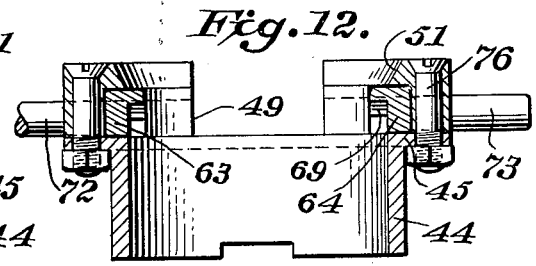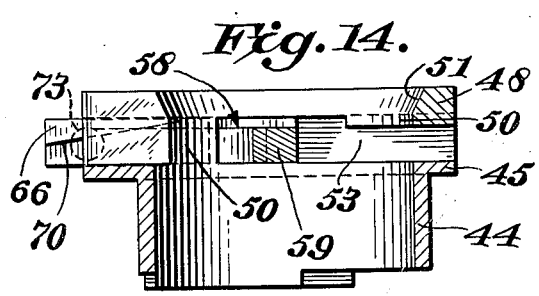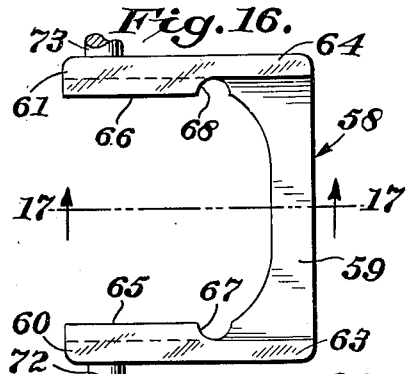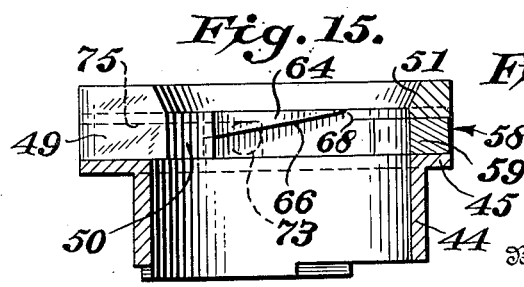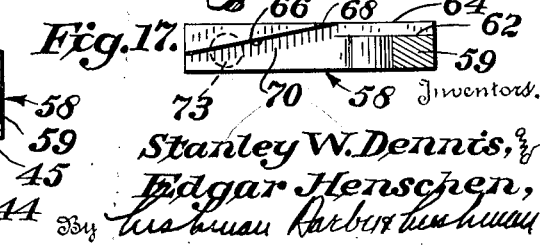
Inventors
Stanley W. Dennis,
Edgar Henschen,
Attorneys Dec. 12, 1950 S. W. DENNIS ET AL 2,533,437
CONTAINER CLOSING APPARATUS
Filed July 1, 1947 4 Sheets-Sheet 4
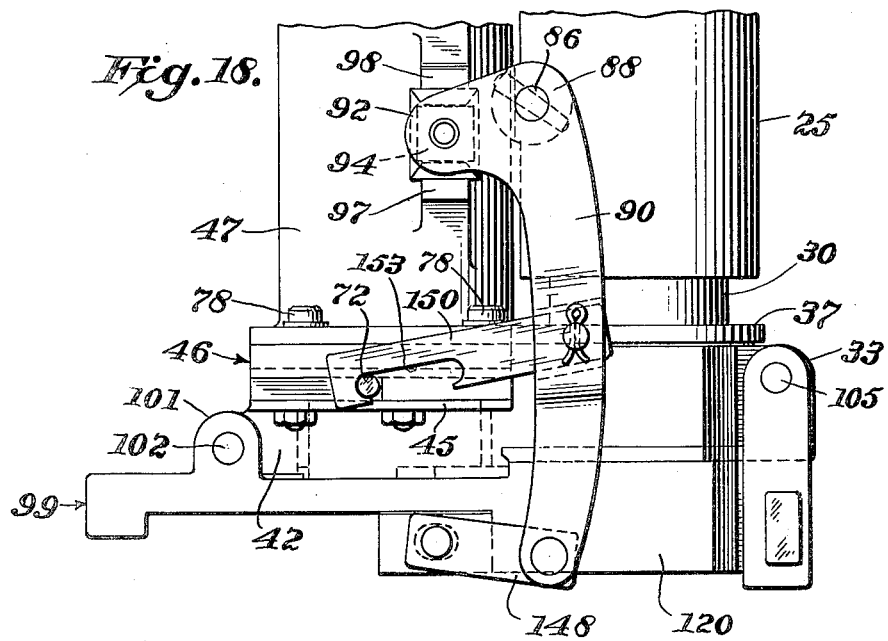
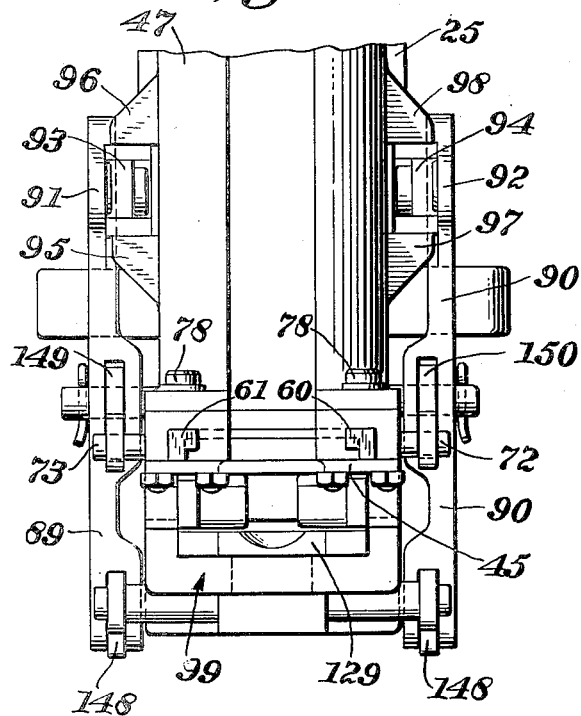
Inventors:
Stanley W. Dennis,
Edgar Henschen,
By Cushman Darby Cushman
Attorneys.

Patented Dec. 12, 1950

2,533,437

UNITED STATES PATENT OFFICE 2,533,437

CONTAINER CLOSING APPARATUS

Stanley W. Dennis and Edgar Henschen, Baltimore, Md., assignors to Crown Cork & Seal Company, Inc., Baltimore, Md., a corporation of New York Application July 1, 1947, Serial No. 758,250

5 Claims. (Cl. 226—88.1)

This invention relates to container closing apparatus of the type comprising a head by means of which closures are applied to containers as the result of the intermittent relative approach of the head and successive containers, and including means by which closures are transferred from a magazine to position for application between each closing action.

One of the objects of the invention is to provide, in such apparatus, improved means for separating the lowermost closure in the stack in the magazine and dropping the same upon the transfer slide, while supporting the remaining closures in the stack in an improved manner by the separating and dropping means.

Another object is to provide an improved slide, cooperating with the closure separating and dropping means to transfer the separated closure from position in axial alignment with the magazine to the applying position.

Another object of the invention is to provide means for separating closures from the bottom of a stack in a magazine, which may be readily substituted for similar means heretofore employed in capping apparatus, and which may be used to convert the machine from operation with one type or size of closure to operation with a generally similar closure of different size. Thus, the present invention provides an improved closure feeding device and also a device for converting old machines for use with new and improved closures having smaller overall diameters.

Other and further objects and advantages of the invention will be apparent from a consideration of the embodiment shown for purposes of illustration in the accompanying drawings and described below.

In the drawings:

Figure 1 is a vertical sectional view taken through the axes of the capping head and magazine;

Figure 2 is a horizontal section and partial elevation, taken substantially on line 2—2 of Figure 1;

Figure 3 is a plan view of the improved cap or closure, with which the apparatus of the present invention is adapted to operate;

Figure 4 is a side elevation of a stack of such caps;

Figure 5 is a fragmentary view similar to Figure 1, showing the parts in a different position;

Figure 6 is a fragmentary view taken on the same plane as Figure 2, with the parts in the position shown in Figure 5;

Figure 7 is a vertical section and elevation, taken on line 7—7 of Figure 5;

Figure 8 is a section with certain parts omitted, taken on line 8—8 of Figure 2;

Figure 9 is a plan view of the combined adapter and cap separating and stack supporting mechanism;

Figure 10 is an elevation looking from the left of Figure 9;

Figure 11 is an elevation looking from the right of Figure 9;

Figure 12 is a sectional view through the assembly of Figure 9 with the cap separator in a different position;

Figure 13 is a side elevation of the assembly of Figures 9-11, looking from the lower side of Figure 9;

Figure 14 is a sectional view taken at right angles to the plane of Figure 12;

Figure 15 is a similar section, with the cap separating element in the other position;

Figure 16 is a plan view of the cap separating element removed from the other parts of the assembly;

Figure 17 is a vertical section on line 17—17 of Figure 16;

Figure 18 is a fragmentary side elevation of the apparatus of Figure 1, and

Figure 19 is an end elevation looking from the left of Figure 18.

Basically, the illustrated capping head is similar to that shown in Figure 11 of the patent to Huntley and Rau, No. 1,956,218 of April 24, 1934. In the said Figure 11, the closures are shown as being relatively flat although somewhat shouldered circumferentially. The caps shown in Figures 3 and 4 of the present drawings are of the type disclosed and claimed in the copending application of Stanley W. Dennis, Serial No. 723,630, filed January 22, 1947, now Patent No. 2,497,870 issued February 21, 1950, for Method of and Apparatus for Making Container Closures and Resulting Products. The cap generally designated at 20 has a circular top wall 21, a depending skirt 22 and an out-turned radially corrugated peripheral flange 23. The skirt is slightly shouldered peripherally at 24 to control the nesting of the caps when stacked and to maintain the flanges a substantial distance apart, all as is explained in the above mentioned Dennis application. For a given size of bottle, the original blanks both for the closure shown in Figure 11 of the Huntley and Rau patent and Figures 3 and 4 of the present application have the same diameter. However, due to the partial preforming of the present cap and the substantial depth of the skirt 22, the new cap is of substantially smaller overall diameter than the cap of the patent. While the present invention is by no means limited to the conversion feature, one of its objects, as previously stated, is to provide means whereby older apparatus, already in use by bottling concerns, for instance like that shown in the Huntley and Rau patent, may be readily converted for handling and applying the smaller diameter caps of the Dennis application.

The apparatus of the type with which the present invention is concerned is shown and described in considerable detail in the copending application of Dennis and Henschen, Serial No. 723,987, filed January 24, 1947, now Patent No. 2,518,294, issued August 8, 1950, and reference is made to that application for a description of the parts common to the two constructions. The capping head comprises a cylindrical bracket 25, adapted to be mounted upon a rotary turret or the like, as disclosed in the patent to Stewart and Franz, 2,211,786 of February 23, 1943, although it should be understood that the bracket may be supported in any other appropriate machine, providing relative movement between the bottle to be capped and the bracket as well as the parts carried thereby for relative movement with respect thereto.

Splined in the bracket for vertical reciprocation is the cylindrical stem portion 30 of the throat carrier 31, the top of the stem carrying a roller 32 for the purpose described in the said Stewart and Franz patent. The carrier includes a base block 33 which provides a circular chamber coaxial with the stem, in which an expansible throat 34 is disposed, in surrounding relation to a presser foot 35. A spring 36, which urges the throat and a foot abutment 37 upwardly seats at its lower end on a plate 38 supported through a tongue and groove at the left, front end and at its rear, inner end by a pin 39 which extends between vertical flanges 40 and 41 (Figure 2) formed integrally at the rear end of block 33, plate 38 having an opening in which the throat is freely received. This structure is all generally similar to that shown in the above-mentioned Huntley et al. patent.

At its outer, rear end 42 the block 33 is provided with a cylindrical aperture 43, which receives an adapter sleeve 44 forming a part of the cap separating and dropping assembly hereinafter described. The adapter sleeve facilitates handling of the smaller caps described above and has an upper flange 45, supported upon the upper surface of the rear portion 42 of block 33. The diameter of the opening 43 in the present instance is of a diameter to pass with slight clearance the relatively flat closures of the Huntley and Rau patent, but the adapter sleeve 44 has an internal diameter to pass with slight clearance the smaller caps of the type shown in Figures 3 and 4.

Above the flange 45 of the sleeve 44, there are positioned the closure separating and feeding elements of the adapter unit, represented generally at 46, and upon which the cylindrical magazine tube 47 of the prior applications and patents may be mounted. The cap separator assembly (Figures 9-17) comprises a block 48, having a slotted open end portion 49 communicating with a cylindrical opening 50, of a size corresponding to that of the interior bore of the sleeve 44 and aligned coaxially therewith. The upper portion of the opening 50, however, is flared outwardly as at 51, so that its upper margin substantially registers with the lower end of the magazine tube 47.

The block 48 is undercut along its sides, to provide ways 52, 53, extending from front to back. The undercutting extends across the block from one way to the other at the end adjacent the capping head, as indicated at 54, while at the other ends, the ways are inwardly closed by the block portions defining the slot 49.

Mounted for reciprocation within the undercut portion of the block 48, for sliding movement upon the upper flange 45 of the sleeve 44 is a U-shaped closure separating and stack supporting element 58 (Figures 16 and 17) including a cross head 59 and legs 60, 61, disposed in the ways 52, 53. The head 59 has an upper surface 62 disposed upon a horizontal plane below the upper surfaces 63, 64 of the legs 60, 61. The inner side faces of the legs are provided with inwardly projecting blade or wedge members 65, 66, terminating in blade-like edges 67, 68, at the line of junction between their upper surfaces, constituting continuations of the surfaces 63, 64, and their lower inclined surfaces 69, 70. At their ends, the legs 60 and 61 carry laterally projecting pins 72, 73, mounted for reciprocating movement in openings 74, 75 formed in the side edges of the block 48 and communicating with the ways in which the legs are mounted.

The block 48 may be secured to the flange 45 of the adapter sleeve 44 by appropriate bolts and nuts 76. Threaded openings 77 may be formed in the upper surface of the block, to facilitate securing the magazine tube 47 thereto, by screws 78, as shown in Figures 18 and 19.

The inner surface of the magazine tube 47 (Figure 1) includes upper and lower cylindrical portions 82, 83 separated by a shoulder 84. The diameter of the upper portion 82 is such as to enable it to receive a tubular package of caps of the type shown in the Huntley and Rau patent with the tube supported by the shoulder 84, as indicated in Figure 11 of said patent. The diameter of portion 83 is, as here shown, the same as that of the aperture 43 in the front portion 42 of the block 33 and is of a size to receive the package tube for the caps 20 shown in Figures 3 and 4, the inclined surface 51 of the block 48 projecting inwardly to provide a shoulder for the support of the package tube.

A transverse pin 86 (Figures 2 and 18) is supported by the bracket 25 and has pivotally mounted on its ends a pair of parallel bell crank levers 87, 88 having downwardly projecting arms 89 and 90. The bell crank levers include rearwardly projecting arms 91 and 92, to the ends of which are pivoted, on coaxial pins, rectangular blocks 93 and 94, slidable in horizontal grooves defined by the lateral ribs 95, 96 and 97, 98, on the sides of the magazine cylinder 47.

Below the block 33 there is hingedly supported a platform 99 (Figures 1 and 2) having upstanding ears 100 and 101, coaxially bored for the pivotal reception of a hinge pin 102, supported in a transverse bore in the outer extremity 42 of base block 33. At its inner end the platform has extensions 103 constituting keepers of slightly hooked form, as shown in Figures 1 and 5. Extensions 40 and 41 of the base block 33 support a transverse pivot pin 105 for a large yoke 106, whose arms are spaced apart so as to straddle the keepers 103 and 104. A pin 107 having a flat side is mounted in the lower ends of the yoke arms and has its position controlled by a spring pressed plunger, as and for the purpose fully shown and described in the aforesaid co-pending application of Dennis and Henschen, Serial No.

723,987. By manipulating the pin 107, as there described, the platform may be released at its rear end and swung downwardly about the pin 102, to give access to the parts thereabove.

The platform 99 has side walls 116 and 117 which are flat on top, except for ears 100 and 101, these walls being bounded inwardly by parallel grooves 118 and 119 which intersect the opposite sides of an opening formed in an annulus 120 at the thickened inner end of the platform 99 and coaxial with the throat chamber. This aperture has a cylindrical surface 123 and a downwardly and outwardly flared surface 124 therebelow, which serves as a guide for the bottle cap. The platform 99 has a top central groove 125 intersecting the opening 123 and parallel ribs 126 and 127 between the inner and outer grooves, substantially lower than the side walls 116 and 117. A central slot 128 extends from the end of the platform 99 to the front wall of the annular member 120. Thus, throughout the major portion of its length, the central groove 125 has an open bottom.

The slide 129, adapted for reciprocating movement upon the platform 99 has parallel bottom grooves 130 and 131 (Figure 8) which receive the rails 126 and 127, with the top of the slide in substantial registry with the tops of the side walls 116 and 117. The left-hand end of the slide, as viewed in Figures 1, 2, and 5 has a flat upper surface, from which a pair of extensions 133, 134 project toward the capping throat, including depressed horizontal ledges 135 and 136, defined by upwardly projecting walls 137 and 138, spaced apart a distance slightly greater than the diameter of the flange of the cap to be applied. The space between the extensions is bounded at the left by a cross-wall 139, from the lower portion of which projects a ledge 140, having a top surface on the same plane as ledges 135 and 136, the latter being provided at their forward ends with upwardly projecting stops providing, with wall 139 a three-point centering means for a cap supported on the ledges, as explained in the aforesaid Dennis and Henschen application.

Projecting downwardly from the slide 129, through the opening 128 in the platform is a tubular stud 143, connected, as explained in the above mentioned Dennis and Henschen application, by links 148, to the bell crank arms 89 and 90, whereby reciprocating movements are imparted to the slide, as hereinafter explained.

Referring to Figures 2, 7, 18 and 19, the arms 89 and 90 of the bell crank levers have links 149 and 150 pivotally attached thereto, intermediate their ends. The arms are provided with elongated slots 152, 153, which may have open bottoms and closed ends, embracing the pins 73 and 72 with a lost motion connection so that the pins and the cap separator element 58 connected thereto are shifted forwardly and rearwardly at the end portions of the oscillating strokes of the bell crank levers 89 and 90.

In Figures 1, 2, 15, and 18, the apparatus is in the normal or raised position. The blade or wedge members 65 and 66 of the U-shaped cap separating and stack supporting element 58 are disposed directly beneath and in supporting relation to the flange of the lowermost cap 20 in the stack in the magazine. Another cap 20A is positioned upon the flat rear end of the slide 129, while still another cap 20B is positioned upon the forward extensions 133 and 134 of the slide, the top surface of cap 20B being spaced below the presser foot 35 a distance slightly greater than the thickness of the end stops. When a bottle is now lifted into the opening 120 and into engagement with the cap, the latter will, first of all, be lifted against the presser foot so that its flange will be above the stops. As the rise of the bottle continues, the throat carrier, the block 33, the platform 99 and the magazine 47 are lifted as a unit so that the bell crank levers are swung clockwise to retract the slide and also, at the end portion of their stroke, through links 149 and 150, to shift the cap separating and stack supporting element 58 rearwardly from the position shown in Figures 1, 2, and 15 to that shown in Figures 5, 6, 9, and 14. During these forward movements of the slide and the separating element 58, the slide extensions 133, 134 are withdrawn from proximate relation to the cap 20B and the latter remains clamped between the end of the bottle and the lower surface of the presser foot 35. The cap 20A drops down onto the ledges 135, 136 of the slide extensions 133, 134, rearward movement of the cap with the slide being restrained by the sleeve 44.

As the blades or wedges are retracted, toward the left, and are withdrawn from the opening 50 out of supporting relation to the flange of the lowermost cap 20, the stack also drops down from its support upon the upper surface of the blades or wedges 65, 66, onto the upper surface 62 of the cross head 59 of the separating element 58 to the position shown in Figures 5 and 6. It will be understood that the cross head 59 moves into stack-supporting relation in the aperture 50 as the blades move out, and vice versa.

As the upward movement of the throat carrier 30 is arrested through abutment with bracket 25, the throat is projected somewhat downwardly against the action of spring 36, and, thereafter, the presser foot spring yields, the bottle rises into the throat, and the cap is applied.

When the cap has been applied and the bottle lowered, the throat carrier and all of the parts supported thereby are lowered toward the rest position of Figure 1. Hence, the bell crank arms 89 and 90 swing in a clockwise direction, from the position shown in Figure 5 to that shown in Figure 1, advancing the slide 129 and, during the end portion of the stroke, shifting the cap separator element 58 forwardly.

As a result of these actions, the cap supported on the slide extensions 133 and 134 is shifted to the position of cap 20B in Figure 1, in axial alignment with the throat and presser foot. Simultaneously, the pointed ends 67 and 68 of the blades or wedges 65, 66 enter above the flange of the lowermost cap in the stack and below the flange of the cap thereabove, in supporting relation to the stack. As the cross head 59 moves out of supporting relation to the lowermost cap, the flange of the latter is positively forced downwardly by the inclined lower surface 70 of each wedge or blade member, thereby causing that cap to drop and depositing it upon the flat upper surface of the front end of the slide 129, whereupon the parts assume the positions shown in Figure 1 and the apparatus is ready for another cap separating, feeding, and applying operation.

Considering the apparatus of the present invention from the aspect of converting the capping head of the Huntley and Rau patent for use with smaller caps, it will be seen that this may be accomplished by (a) removing the cap separating and delivering mechanism therefrom and substituting the assembly shown in Figures 9–15 of the present application; (b) inserting a new throat and adapter fitting; and (c) substituting the platform 99 and its slide 12 for the corresponding mechanism of the patent.

The invention, however, is not limited to the use of the apparatus for conversion purposes, as it provides an inherently improved cap separating and delivering mechanism. Nor is the invention to be limited to the specific details of construction described above and shown in the accompanying drawings, as all modifications coming within the scope of the appended claims and their equivalents are intended to be included.

We claim:

1. An apparatus for applying closures of the type having flanges vertically spaced apart when arranged in a stack, said apparatus including a head comprising a vertical magazine for receiving a stack of closures and a vertical capping throat horizontally spaced from the magazine, guide means extending between the lower ends of said magazine and throat, a slide reciprocatable in said guide means between retracted and advanced positions, said slide comprising a rear portion spaced below the bottom of the stack for receiving and supporting a single closure when the slide is in advanced position, a pair of spaced parallel forward extensions having surfaces at a lower level than said rear portion adapted to support a closure through its flange, means for transferring the closure supported upon said rear portion to said extensions as the slide is retracted, for advance with the extensions to a position below said throat, and means spaced above said slide at the lower end of the magazine for supporting the stack and for delivering the lowermost closure to the rear portion of the slide upon each advancing movement thereof, the last mentioned means comprising a reciprocating element connected to the slide for movement therewith, said element having a flange-supporting surface at one level and another flange-supporting surface at a level spaced thereabove a distance substantially equal to the spacing of the flanges in the stack, whereby, as the element is advanced with the slide, the lower supporting surface is removed, the lowermost cap is dropped and the upper supporting surface is moved into stack supporting relation.

2. An apparatus in accordance with claim 1 in which the first mentioned flange-supporting surface of said element comprises a cross-head and in which the other flange-supporting surface is constituted by blades projecting inwardly from longitudinally extending, laterally spaced legs, said blades being spaced rearwardly from the cross-head and positioned at a higher level.

3. An apparatus in accordance with claim 2 characterized in that said blades have horizontal upper surfaces and downwardly and rearwardly inclined lower surfaces, for positively separating the lowermost closure from the stack as the blades are advanced and as they enter the space between the flanges of the lowermost closure and the one thereabove.

4. An apparatus in accordance with claim 1 in which said element comprises a U-shaped member having a forwardly disposed cross-head constituting the first mentioned flange-supporting surface and rearwardly projecting legs having inwardly projecting blades at a level above the cross-head, said blades constituting the second mentioned flange-supporting surface.

5. An apparatus in accordance with claim 4 characterized in that the upper surfaces of the blades are disposed in a common horizontal plane and the lower surfaces are inclined downwardly and rearwardly, to positively separate the lowermost closure from the stack as the element is advanced and as the blades enter the space between the flanges of the lowermost closure and the one thereabove.

STANLEY W. DENNIS.
EDGAR HENSCHEN.

REFERENCES CITED

The following references are of record in the file of this patent:

UNITED STATES PATENTS

| Number | Name | Date |
|---|---|---|
| 1,956,213 | Huntley et al. | Apr. 24, 1934 |
| 1,964,078 | Podel | June 26, 1934 |
| 2,304,437 | Bell | Dec. 8, 1942 |
| 2,384,052 | Stewart et al. | Sept. 4, 1945 |